(Model.)
L. H. SCOTT.
APPLE PARER.
No. 278,460. Patented May 29, 1883.
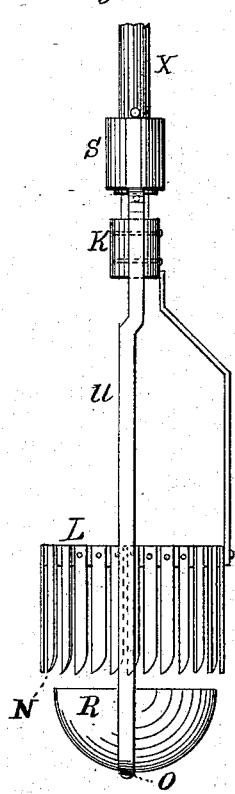
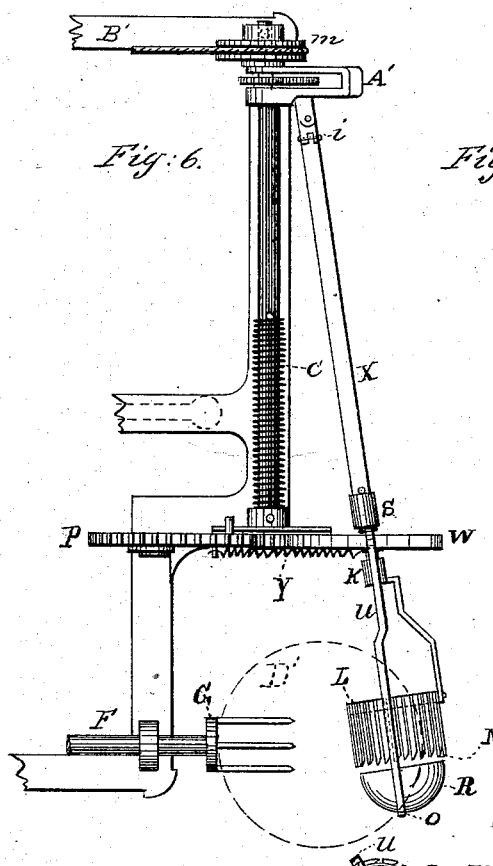
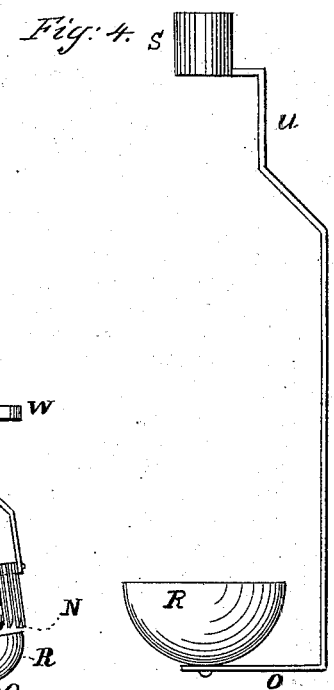
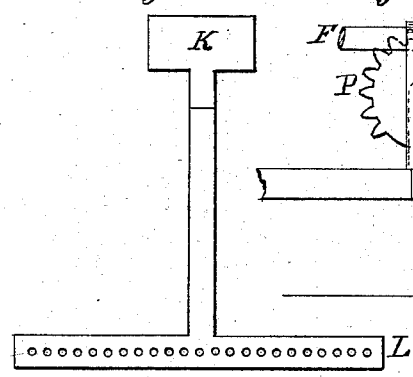
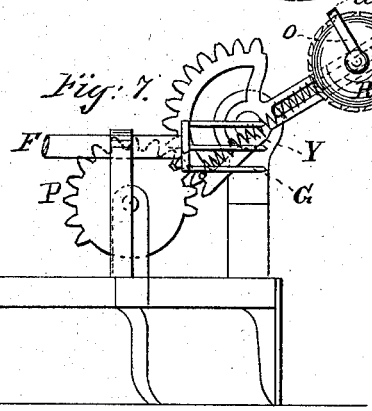
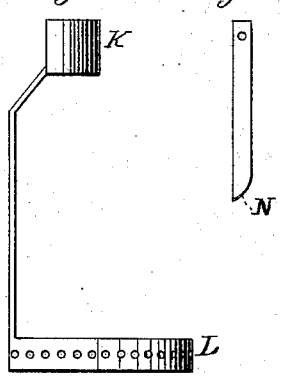
Witnesses:
John C. Tunbridge,
Charles F. Burr.
Inventor:
Lanphear H. Scott.
N. PETERS, Photo-Lithographer, Washington, D. C.

UNITED STATES PATENT OFFICE.

LANPHEAR H. SCOTT, OF BALTIMORE, MARYLAND.

APPLE-PARER.

SPECIFICATION forming part of Letters Patent No. 278,460, dated May 29, 1883.

Application filed September 15, 1882. (Model.)

*To all whom it may concern:*

Be it known that I, L. H. SCOTT, a citizen of the United States, residing at Baltimore, in the State of Maryland, have invented a new and useful Improvement in Fruit-Parers, of which the following is a specification.

My invention relates to an improvement on a certain fruit-paring machine on which Letters Patent No. 30,667 were granted to Messrs. Clewell and Schatz on November 20, 1860, in which a rotary cutter or set of revolving knives is employed to remove the paring from the fruit.

The objects of my improvement are, first, to more effectually and perfectly remove the paring from the fruit or vegetable; second, to afford facilities for more easily and readily sharpening the knives; third, to facilitate the starting or first entering of the knife under the paring of the fruit.

I am well aware that the invention shown in Letters Patent No. 30,667, that being the first rotary cutter or knife employed in fruit-paring machines, contains the prime feature of all the various forms of rotary cutters. That form of cutter, however, as well as others constructed of one piece of metal, &c., are more or less objectionable: first, on account of their tendency to skip or jump portions of the paring, especially if the cutter is slightly dull, or if the machine is turned at a quick speed, leaving a part of the fruit unpared in spots or strips; second, on account of the difficulty in sharpening the knives; third, on account of the difficulty in starting the knife under the rind or paring of the fruit, all of which objections are believed to be completely overcome in the present improvement.

I attain the objects of my invention by the mechanism illustrated in the accompanying drawings, which, when taken in connection with the drawings of Letters Patent No. 30,667, will enable those skilled in the art to construct the entire machine, as my improvement relates solely to the form of cutter or knife used to pare the fruit, the mode of operating the machine being exactly the same in each.

Following is an explanation of the accompanying drawings.

Figure 7 is an end view of my invention. Fig. 6 is a plan view of the invention, showing also so much only of the old machine, to which it is attached, as to clearly illustrate the means of attaching my improved cutter to the old machine in place of the original cutter. Fig. 5 is a plan view of my invention complete in itself. Fig. 4 is a plan view of the "guard." Fig. 3 is the form of the knife-blade used in my invention; Fig. 2, the circular rim to which the knives are screwed; Fig. 1, the same rim before bending to its final form, as seen in Fig. 2.

Similar letters refer to similar parts throughout the several views. Similar letters are also used to indicate in Fig. 6 the corresponding parts of this drawing with the drawings accompanying Letters Patent No. 30,667, so far as the parts represented are the same in each.

The mode of constructing my cutter is as follows: A piece of sheet metal is stamped into the form seen in Fig. 1, which is then bent into the form as seen in Fig. 2, the rim L being then a regular circle, to which the knife-blades are attached by screws. The form of blade used is shown in Fig. 3, the cutting-edge and point being at N. By means of this set of revolving knives with their points in immediate contact with the rind of the object to be pared, the toughest paring, as may be found in peaches or apples having what is termed "dry rot," is readily removed. The knives, being conveniently removable, are sharpened as easily as an ordinary pocket-knife.

Fig. 4 represents what in fruit-paring machines is commonly called the "guard," its object being to regulate the thickness of the paring. It consists of a plain hemisphere, R, attached firmly by rivets to its "arm" $s\ u\ o$ at $o$. This guard R comes down sufficiently near to the points of the knife-blades to permit the paring to escape inside the rim L or set of knives.

The invention complete in itself is shown in Fig. 5.

The knife-arm K L, Fig. 5, is riveted firmly to the shaft X, so that the revolution of said shaft revolves the knives with it.

The guard-arm $s\ u\ o$, striking at U, Fig. 6, on the slotted arm W, is of course prevented from turning. The said guard-arm is loosely connected to the shaft X by means of the sleeve S, so as to permit the shaft X to revolve freely without revolving guard R and arm *s u o* with it.

In Fig. 6 the frame-work B', fork G, shaft F, wheel P, spring Y, spring C, universal joint *i*, slotted arm W, shaft X, apple D, &c., are the same as parts in drawings accompanying Letters Patent No. 30,667.

In place of the cutter Z, I substitute my cutter or set of knives, as shown complete in itself in Fig. 5. The connection between my invention and the operating mechanism of the old machine will thus be readily understood.

I of course do not claim a rotary cutter or set of revolving knives as new in itself; but in their particular arrangement which I adopt a much more satisfactory result is obtained in paring fruit than by the old set of revolving knives or other rotary cutters employed for this purpose.

What I claim, and desire to secure by Letters Patent, is—

In a fruit-paring machine, a rotary cutter consisting of a series of pointed knife-blades set in a circle, constructed and operating in the manner substantially as set forth.

LANPHEAR H. SCOTT. [L. S.]

Witnesses:
 JOHN WILLIAMS,
 ROSWELL S. CLARK.